(12) United States Patent
Rivers et al.

(10) Patent No.: US 12,431,999 B1
(45) Date of Patent: Sep. 30, 2025

(54) TRANSMITTING CLOCK SIGNALS IN NETWORK PACKETS

(71) Applicant: Amazon Technologies, Inc., Seattle, WA (US)

(72) Inventors: James Paul Rivers, Capitola, CA (US); Scott Andrew Emery, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 17/825,970

(22) Filed: May 26, 2022

(51) Int. Cl.
*H04J 3/06* (2006.01)

(52) U.S. Cl.
CPC ............ *H04J 3/0679* (2013.01); *H04J 3/065* (2013.01); *H04J 3/0667* (2013.01)

(58) Field of Classification Search
CPC ......... H04J 3/065; H04J 3/0667; H04J 3/0679
See application file for complete search history.

(56) References Cited

U.S. PATENT DOCUMENTS

| | | | |
|---|---|---|---|
| 4,398,155 A | | 8/1983 | Atwell, Jr. et al. |
| 5,187,780 A | * | 2/1993 | Clark ...................... H04L 12/44 370/394 |
| 5,361,277 A | | 11/1994 | Grover et al. |
| 5,475,717 A | * | 12/1995 | Cordonnier ........... H04J 3/0679 375/357 |
| 5,564,042 A | | 10/1996 | Ventrone et al. |
| 5,790,609 A | | 8/1998 | Swoboda |
| 6,055,021 A | | 4/2000 | Twitchell |
| 6,121,816 A | | 9/2000 | Tonks et al. |
| 6,226,699 B1 | | 5/2001 | Humpherys et al. |
| 6,754,171 B1 | | 6/2004 | Bernier et al. |
| 6,963,990 B2 | | 11/2005 | Allen et al. |
| 7,154,298 B1 | | 12/2006 | Agrawal et al. |
| 7,499,500 B2 | * | 3/2009 | Page ........................ H04J 3/00 375/295 |
| 7,562,247 B2 | | 7/2009 | Baker et al. |

(Continued)

OTHER PUBLICATIONS

How, Denis, "The Free On-Line Dictionary of Computing," Entry "Integrated Circuit." Online Jul. 3, 1997. Retrieved from Internet Feb. 27, 2024. <https://foldoc.org/Integrated+circuit>. (Year:1997).

(Continued)

*Primary Examiner* — Alpus Hsu
(74) *Attorney, Agent, or Firm* — Klarquist Sparkman, LLP

(57) ABSTRACT

A clock signal in a clock distribution network is transmitted using network packets with the clock signal embedded within a bit of the network packets. The network packets can include a preamble used to create phase alignment between a timing pulse and a bit position of a Start of Frame Delimiter (SFD) within the packet. The clock signal associated with the packet occurs when the SFD is detected. In one example, the SFD is detected when two consecutive bits of equal value are received and the timing of the clock signal is such that the clock signal occurs when the second consecutive bit is received. By including a clock signal within a packet, additional information can be transmitted with the clock signal. For example, authentication and validation information can be included, a time stamp, a message type, a frame check sequence, a clock status, a number of hops from the root, etc.

12 Claims, 12 Drawing Sheets

(56) References Cited

U.S. PATENT DOCUMENTS

| | | |
|---|---|---|
| 7,629,828 B1 | 12/2009 | Nekl |
| 7,649,910 B1 | 1/2010 | Wechsler et al. |
| 7,911,239 B2 | 3/2011 | Saint-Laurent et al. |
| 7,969,216 B2 * | 6/2011 | Dennis ................... G06F 1/10 |
| | | 327/261 |
| 8,204,166 B2 | 6/2012 | Bommareddy et al. |
| 8,630,315 B2 * | 1/2014 | Rivaud ................ H04J 3/0641 |
| | | 370/522 |
| 8,975,921 B1 | 3/2015 | Sangolli et al. |
| 9,276,688 B2 * | 3/2016 | Lindner ............... H04J 3/0638 |
| 9,628,259 B2 * | 4/2017 | Lanzone .............. H04J 3/1652 |
| 10,084,559 B1 | 9/2018 | Devineni |
| 11,212,068 B1 | 12/2021 | Liu et al. |
| 11,263,377 B1 | 3/2022 | Majumdar et al. |
| 11,509,410 B2 | 11/2022 | Furtner |
| 11,606,156 B1 | 3/2023 | Duda et al. |
| 11,757,610 B1 | 9/2023 | Kessel et al. |
| 2003/0184347 A1 | 10/2003 | Haroun |
| 2005/0117571 A1 * | 6/2005 | Dyke ....................... H04J 3/02 |
| | | 370/376 |
| 2005/0259505 A1 | 11/2005 | Grand et al. |
| 2008/0046774 A1 | 2/2008 | Hirai et al. |
| 2008/0094108 A1 | 4/2008 | Leon |
| 2009/0092210 A1 | 4/2009 | Green et al. |
| 2013/0301635 A1 | 11/2013 | Hollabaugh et al. |
| 2016/0057317 A1 * | 2/2016 | Zhao .................. H04N 21/8358 |
| | | 348/515 |
| 2017/0104727 A1 | 4/2017 | Jerkeby et al. |
| 2019/0356313 A1 | 11/2019 | Venugopal et al. |
| 2019/0379599 A1 | 12/2019 | Siracusano et al. |
| 2020/0003883 A1 * | 1/2020 | Doaré ................. H04L 27/0008 |
| 2021/0266085 A1 * | 8/2021 | Evans .................. H04J 3/0667 |
| 2021/0337498 A1 | 10/2021 | Lee et al. |
| 2021/0382519 A1 | 12/2021 | Chang |
| 2022/0069970 A1 | 3/2022 | Snowden et al. |
| 2022/0286267 A1 | 9/2022 | Niimi et al. |
| 2023/0060679 A1 | 3/2023 | Pustylnik et al. |
| 2023/0079341 A1 | 3/2023 | Afshari |
| 2023/0134197 A1 | 5/2023 | Heinrich et al. |
| 2023/0185757 A1 | 6/2023 | Takefman et al. |
| 2024/0097783 A1 | 3/2024 | Rolston et al. |
| 2024/0361981 A1 | 10/2024 | R |

OTHER PUBLICATIONS

IEEE Standard for Information Technology—Telecommunications and Information Exchange between Systems Local and Metropolitan area Networks—Specific Requirements, Part 11: Wireless LAN Medium Access Control (MAC) and Physical Layer (PHY) Specifications, IEEE Computer Society, IEEE Std. 802.11-2020, 4,379 pages. (in U.S. Appl. No. 17/848,256 and can be found in Patent Center.).

* cited by examiner

TRANSMITTING CLOCK SIGNALS IN NETWORK PACKETS

BACKGROUND

Computing devices can utilize communication networks to exchange data. Companies and organizations operate computer networks that interconnect computing devices to support operations or to provide services to third parties. The computing systems can be located in a single geographic location or located in multiple, distinct geographic locations. Data centers or data processing centers, herein generally referred to as a "data center," may include a number of interconnected computing systems to provide computing resources to users of the data center.

To facilitate increased utilization of data center resources, virtualization technologies allow a single physical computing device to host one or more instances of virtual machines that operate as independent computing devices to users of the data center. With virtualization, the single physical computing device can create, maintain, delete, and manage virtual machines in a dynamic manner. In turn, users can request computer resources from the data center and be provided with virtual machine resources. These virtual machines carry out a wide variety of functionalities, such as invoking network-accessible services, conducting data processing, etc.

In some cases, multiple computing devices may be interconnected to provide desired functionality. Such devices may be referred to as "distributed," such as by implementing a distributed service or a distributed computing environment. One challenge that often occurs in distributed computing is the difficulty of creating a shared notion of time. It may be desirable to use time information to implement various policies in a computing service, such as to resolve priority of conflicting requests. However, in the distributed context, each device may have an independent notion of time, and, as such, it may be difficult to determine which conflicting requests occurred first. A variety of techniques exist to attempt to synchronize time between networked computers. For example, the Network Time Protocol (NTP) enables computing devices to communicate with a reference timekeeper over a network and receive a current time. NTP can be used to synchronize a plurality of computers in a network to a universal time clock. However, such techniques are typically not sufficiently accurate or are too complex to implement in wide-scale distributed computing platforms. Additionally, the current techniques provide little information other than a clock signal.

DETAILED DESCRIPTION

A clock signal in a clock distribution network is transmitted using network packets with the clock signal embedded within a bit of the network packets. The network packets can include a preamble used to create phase alignment between a timing pulse and a bit position of a Start of Frame Delimiter (SFD) within the packet. The clock signal associated with the packet occurs when the SFD is detected. In one example, the SFD is detected when two consecutive bits of equal value are received and the timing of the clock signal is such that the clock signal occurs when the second consecutive bit is received. By including a clock signal within a packet, additional information can be transmitted with the clock signal. For example, this can include authentication and validation information, a time stamp, a message type, a frame check sequence, a clock status, a number of hops from the root, etc. Other information can be included depending on the particular application. A clock selection circuit used to transmit the network packets can be an Integrated Circuit (IC) and can be programmable, such as a Field Programmable Gate Array (FPGA). Ultimately, the clock signal can be received by server computers to ensure instances being executed have accurate and synchronized timing.

Figure 1:
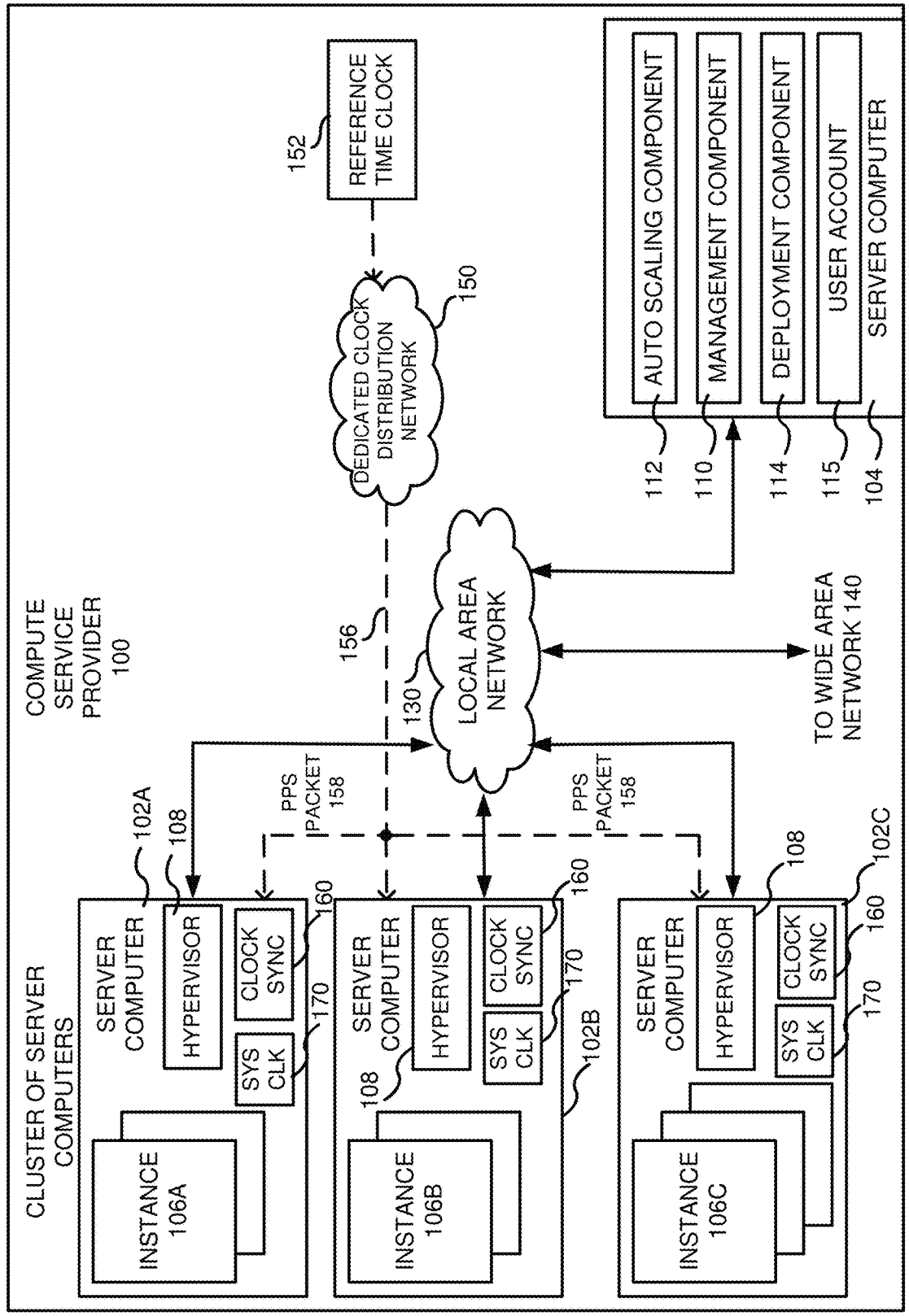
FIG. 1 is an example system diagram showing a plurality of virtual machine instances running in a multi-tenant environment with separate networks for communication and clock distribution, with clock switching hardware selecting between multiple clock sources.

FIG. 1 is a computing system diagram of a network-based compute service provider 100 that illustrates one environment in which embodiments described herein can be used. By way of background, the compute service provider 100 (e.g., the cloud provider) is capable of delivery of computing and storage capacity as a service to a community of end recipients. In an example embodiment, the compute service provider can be established for an organization by or on behalf of the organization. That is, the compute service provider 100 may offer a "private cloud environment." In another embodiment, the compute service provider 100 supports a multi-tenant environment, wherein a plurality of users operate independently (e.g., a public cloud environment). Generally speaking, the compute service provider 100 can provide the following models: Infrastructure as a Service ("IaaS"), Platform as a Service ("PaaS"), and/or Software as a Service ("SaaS"). Other models can be provided. For the IaaS model, the compute service provider 100 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 100 using networked client devices, such as desktop computers, laptops, tablets, smartphones, etc. running web browsers or other lightweight client applications. Those skilled in the art will recognize that the compute service provider 100 can be described as a "cloud" environment.

In some implementations of the disclosed technology, the computer service provider 100 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 100 includes a plurality of server computers 102A-102C. While only three server computers are shown, any number can be used, and large centers can include thousands of server computers. The server computers 102A-102C can provide computing resources for executing software instances 106A-106C. In one embodiment, the instances 106A-106C are virtual machines. As known in the art, a virtual machine is an instance of a software implementation of a machine (i.e., a computer) that executes applications like a physical machine. In the example of virtual machine, each of the servers 102A-102C can be configured to execute a hypervisor 108 or another type of program configured to enable the execution of multiple instances 106 on a single server. Additionally, each of the instances 106 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 104 can be reserved for executing software components for managing the operation of the server computers 102 and the instances 106. For example, the server computer 104 can execute a management component 110. A user can access the management component 110 to configure various aspects of the operation of the instances 106 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 112 can scale the instances 106 based upon rules defined by the user. In one embodiment, the auto scaling component 112 allows a user to specify scale-up rules for use in determining when new instances should be instantiated and scale-down rules for use in determining when existing instances should be terminated. The auto scaling component 112 can consist of a number of subcomponents executing on different server computers 102 or other computing devices. The auto scaling component 112 can monitor available computing resources over an internal management network and modify resources available based on need.

A deployment component 114 can be used to assist users in the deployment of new instances 106 of computing resources. The deployment component can have access to account information associated with the instances, such as who is the owner of the account, credit card information, country of the owner, etc. The deployment component 114 can receive a configuration from a user that includes data describing how new instances 106 should be configured. For example, the configuration can specify one or more applications to be installed in new instances 106, provide scripts and/or other types of code to be executed for configuring new instances 106, provide cache logic specifying how an application cache should be prepared, and other types of information. The deployment component 114 can utilize the user-provided configuration and cache logic to configure, prime, and launch new instances 106. The configuration, cache logic, and other information may be specified by a user using the management component 110 or by providing this information directly to the deployment component 114. The instance manager can be considered part of the deployment component.

User account information 115 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

A network 130 can be utilized to interconnect the server computers 102A-102C and the server computer 104 for transmission of packet data therebetween. The network 130 can be a local area network (LAN) and can be connected to a Wide Area Network (WAN) 140 so that end users can access the compute service provider 100. It should be appreciated that the network topology illustrated in FIG. 1 has been simplified and that many more networks and networking devices can be utilized to interconnect the various computing systems disclosed herein.

A second network 150 can be independent of the local area network 130 and use separate cabling for interconnecting the server computers 102A-102C. More specifically, the second network 150 can be a dedicated clock distribution network that receives a reference time clock 152 and that distributes the reference time clock via a dedicated cabling 156 (shown in dashed lines) to the server computers 102A-102C. In some instances, the second network 150 can share cables with the local area network 130, although different wires in the cable are used for the different networks. For example, connection to the server computers 102 can use the same cable for both the local area network 130 and the clock distribution network 150. The reference time clock 152 can be a highly reliable and auditable microsecond range UTC time source that delivers a pulse over the timing network 150 at predetermined time intervals, such as one pulse per second (pulse per second (PPS)) embedded within a packet 158. The server computers 102A-102C can receive the time signal from the dedicated timing network 150 via the independent cabling 156 and use the time signal within a clock synchronization firmware 160 to synchronize a system clock 170 on the server computer. The synchronized system clock 170 can then be used by the instances 106A-106C on the server computers 102A-102C. In this way, each of the server computers 102A-102C operates on the same timing.

As described further below, the dedicated clock distribution network 150 can generate the PPS signal in the form of a packet that includes not only a clock pulse, but additional metadata, which can provide information about the PPS signal. In a simple example, the packet can include identification information, status information, authentication information, encryption information, etc. The identification information can be as follows:

| | |
|---|---|
| MAC Address | 6 byte MAC address unique to the appliance (eth0 MAC) |
| IPv4 Address | The IPv4 address assigned to the eth0 interface |
| IPv6 Address | The IPV6 address assigned to the eth0 interface |
| Serial Number | The serial number of the appliance (from system EEPROM) |
| Model Number | The type of appliance (from system EEPROM) |
| Host Name | The name assigned to the appliance (from hostname command) |
| Port Number | The port number through which the packet is being sent |
| Port String | The name of the port through which the packet is being sent |
| Domain ID | The clocking domain |
| OS Version | The Operating System version running on the appliance |
| Management applied identity (e.g. UUID) | Any unique identifier assigned to the appliance can be used |

The status information can be as follows:

---

Tier level for each timing source-Each timing port increments the tier level received on that port. The currently selected timing port's value is sent on distribution ports.
Current root clock source name-An identifier configured on each timing port of the core (root). Passed down through the distribution tree.
Time to live parameter--To prevent frames from looping forever.
Local clock frequency in Hz
Current propagation delay (only sent on distribution ports)
Current propagation delay of all distribution ports (only sent on timing ports)
Port status of all distribution ports
Timing source status-The status of each timing source.
Locked
Holdover
Free running
Invalid
Training
Indication to move away from this timing source, with ack from downstream
Indication that the downstream device is going out of service
Quality of timing source being received
Quality of propagation delay measurement
Message type (sync/return)

---

The authentication can include a Cyclic Redundancy Check (CRC), a sequence number or Hash-based Message Authentication Code (HMAC). The encryption can relate to standards used, such as IEEE 802.1AE. The clock signal can be a single bit within the packet and the timing of how the bit is transmitted can align with the reference time clock 152. The clock synchronization circuit 160 can extract the clock from the PPS packet 158 and set the system clock 170 accordingly. Additionally, the clock synchronization circuit 160 can use any of the identification, status, authentication, and encryption to determine whether the PPS packet is acceptable and should be used.

Figure 2:
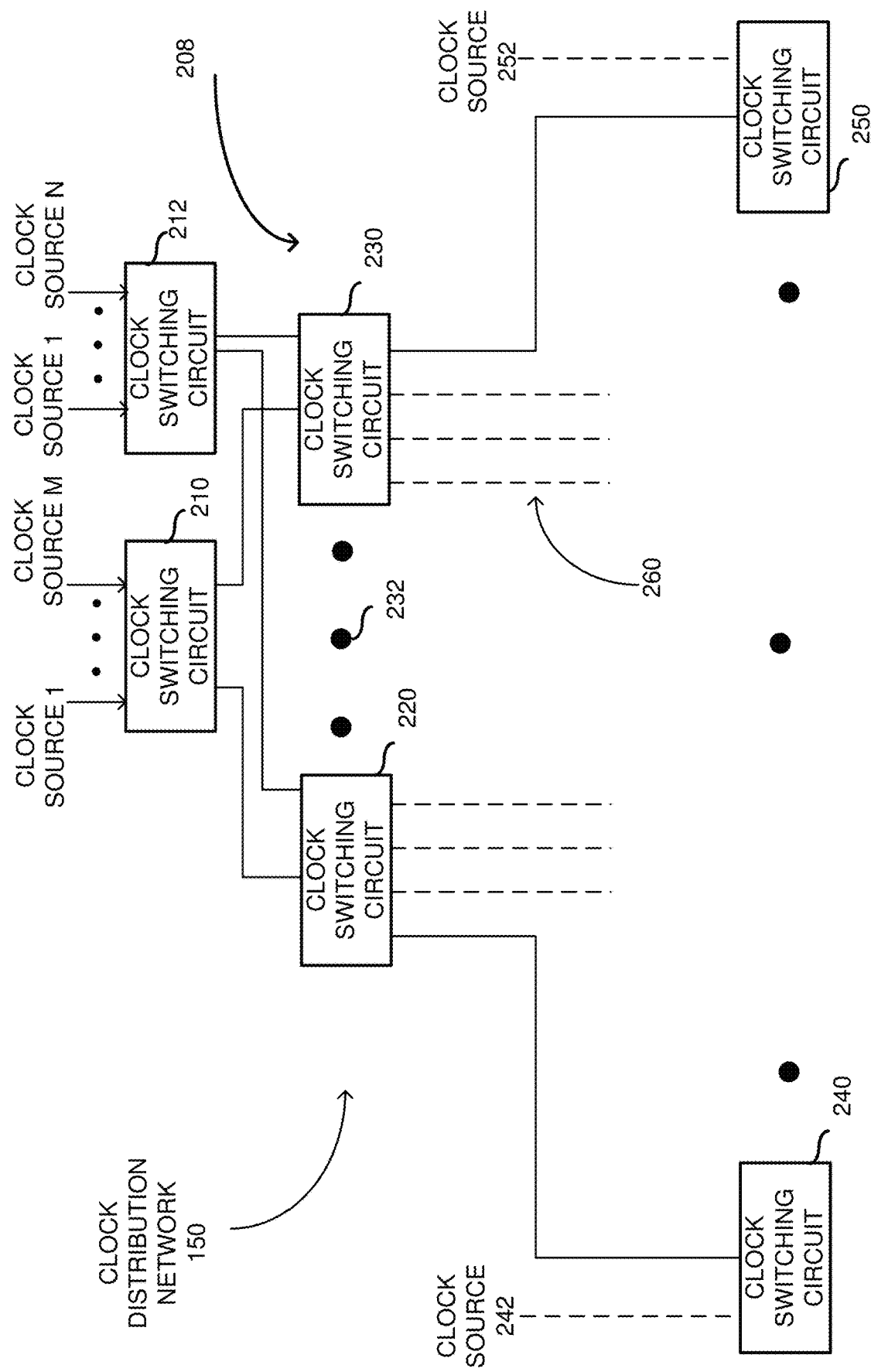
FIG. 2 shows an embodiment of the clock distribution network of FIG. 1 with a hierarchical structure of clock switching circuits.

FIG. 2 shows an example of the clock distribution network 150 of FIG. 1, which can include a hierarchical structure 208 of clock switching circuits. At a top level, clock switching circuits 210, 212 can receive input clock signals from different sources. The different sources allow for redundancy should one of the sources fail or become inaccurate. For example, clock switching circuit 210 receives M input clock signals, where M is any integer number. Likewise, the clock switching circuit 212 receives N input clock signals. Some of the clock sources into switching circuit 210 can be the same sources input into clock switching circuit 212, and other clock sources can be different. The clock switching circuits 210, 212 each selects one of the clock inputs and distributes the selected clock signal to multiple other clock switching circuits 220, 230 at a second layer of the clock distribution network 150. Although the second layer shows only clock switching circuits 220, 230, the repetitive dots 232 represent that any number of clock switching circuits can form the second layer. In one example, each clock switching circuit generates 48 output clock signals. In such a case, the second layer has 48 different clock switching circuits and a next layer has 48*48=2.304. A final layer including clock switching circuits 240, 250 is shown coupled to the second layer, but many intermediate layers can be positioned between the second layer and the last layer depending on the number of layers in the hierarchical structure 208. The clock switching circuits 240, 250 can receive inputs from a layer of clock switching circuits above it, and also can receive inputs from other clock sources, as shown by clock sources 242, 252. At 260, clock signal paths are shown in dashed merely to indicate that each clock switching circuit 230 outputs multiple other clock signals. Ideally, each clock switching circuit receives the selected clock signal at the same time. The clock signals are then distributed to server computers within a compute server provider environment.

Figure 3:
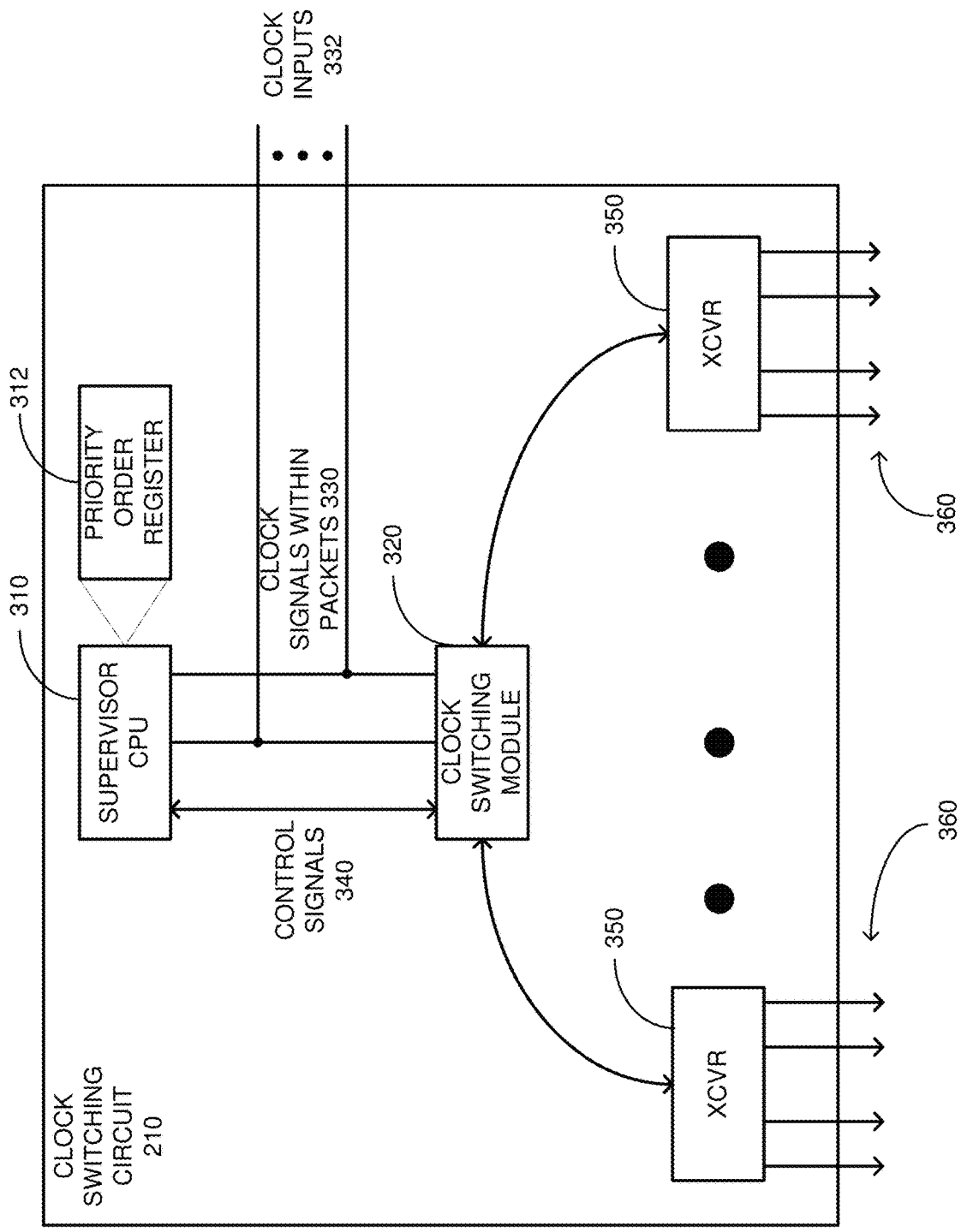
FIG. 3 is an embodiment of a clock switching circuit of FIG. 2 including a clock switching module.

FIG. 3 is a particular example of a clock switching circuit, such as clock switching circuit 210 from FIG. 2. The clock switching circuit 210 can be a single IC or multiple ICs and includes a supervisor central processing unit (CPU) 310 and a clock switching module 320. The supervisor CPU 310 can receive clock input signals within packets 330 from clock inputs 332 and analyze the clock signals within the packets 330 to ensure the signals are valid. For example, the clock signals can include pulses that occur at predetermined intervals (e.g., every 1 second) and the supervisor CPU 310 can generate or read a timestamp every time a pulse is received. The supervisor CPU 310 can then calculate a difference between the timestamps and compare the difference to a predetermined value (e.g., 1 second). If the difference calculation is within a threshold limit of the predetermined value, then the clock signal can be validated. Thus, time stamps are analyzed independently for each clock signal to determine if that clock signal's timing is accurate. Generally, the most accurate clock signal can be used, wherein the most accurate is the clock signal having the expected period. Otherwise, if the difference is outside of the limit, then the clock signal is invalidated and the supervisor CPU can exclude the clock signal from being used. The results of the analysis can be stored in a priority order register 312. Using the analysis, the supervisor CPU 310 generates control signals 340 that control which clock input 332 is used. For example, the supervisor CPU 310 can generate an identifier for use by the clock switching module. The supervisor CPU 310 also can be used to analyze the metadata within the received packets and determine whether the received packets are authenticated, validated, or otherwise usable.

The clock signals 330 are also transmitted to the clock switching module 320 that receives the control signal 340 from the supervisor CPU 310. The control signal 340 selects one of the clock signals 330 to be distributed to multiple transceivers 350 to be repeated to a next layer in the clock distribution network, as shown at 360. As described above, the clock signals transmitted by the transceivers 350 are embedded within packets. Thus, multiple clock signals are received, but only one of the clock signals is passed to the multiple transceivers for distribution to the clock distribution network. Although the supervisor CPU 310 is described as analyzing the metadata within the packets, the clock switching module 320 can perform the analysis on the received packets and make the determination whether or not to accept the received packets.

Figure 4:
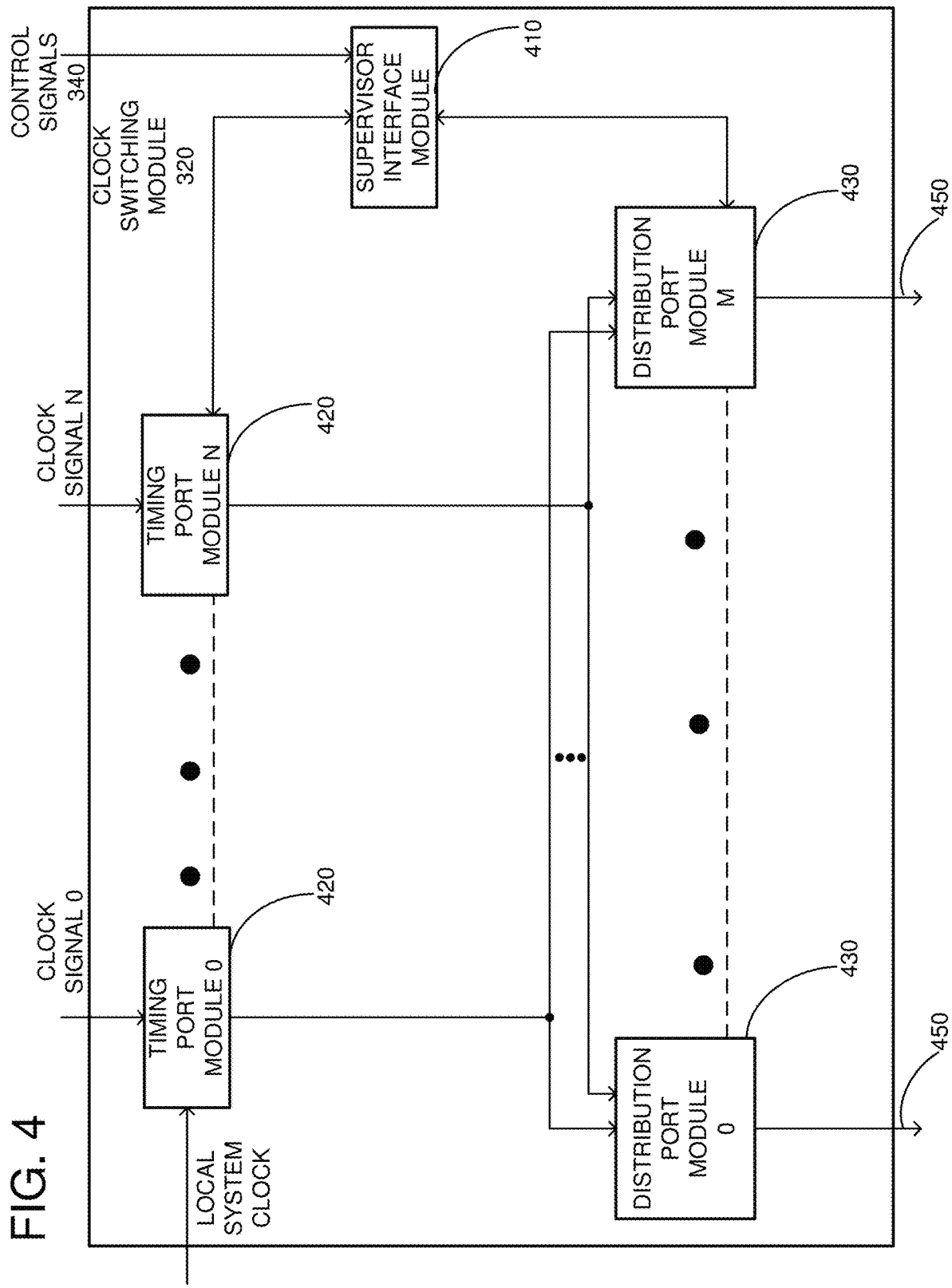
FIG. 4 is an embodiment of the clock switching module of FIG. 3, including a timing port module and a distribution port module.

FIG. 4 shows further details of the clock switching module 320, which can be a single IC, for example. The clock switching module 320 includes a supervisor interface module 410, which receives the control signals 340 from the supervisor CPU 310 (FIG. 3) and distributes the control signals 340 to a plurality of timing port modules 420. The timing port modules 420 have a one-to-one relationship with the clock signals 330 (FIG. 3), the clock signals being shown as including clock signal 0 through clock signal N, where N is any integer number. As described above, the clock signals are embedded within packets and can be extracted therefrom using the timing port modules. The timing port modules 420 can generate a timestamp for each pulse received and pass the timestamps to the supervisor CPU 310 (FIG. 3) through the supervisor interface module 410, which is coupled in parallel to each timing port module 420. In such a case where time stamps are generated by the timing port module 420, the clock signals 330 need not be read directly by the supervisor CPU (as is shown in FIG. 3). The timing port modules 420 can also analyze metadata within the packets to determine whether the packets are valid. Additionally, the supervisor interface module 410 is coupled in parallel to a plurality of distribution port modules 430. Each distribution port module 430 is coupled to all of the timing port modules 420 and passes one of the signals from the timing port modules to an output port 450. There are typically more distribution port modules 430 than timing port modules 420. For example, there are M distribution port modules 430 shown, where M is any integer value. In one simple example, there can be four timing port modules and 48 distribution port modules 430. However, each distribution port module 430 outputs one clock signal 450. Thus, the clock switching module 320 typically receives a number of clock signals N, selects one of the clock signals and replicates the selected clock signal on a greater number of output, where M>N. The clock signals are embedded within packets and retransmitted by the distribution port modules 430. The timing port modules 420 can also modify the metadata within the packets, such as by changing identification information, for example. In a specific example, the timing port module can update or change any of the identification or status information described above.

Figure 5:
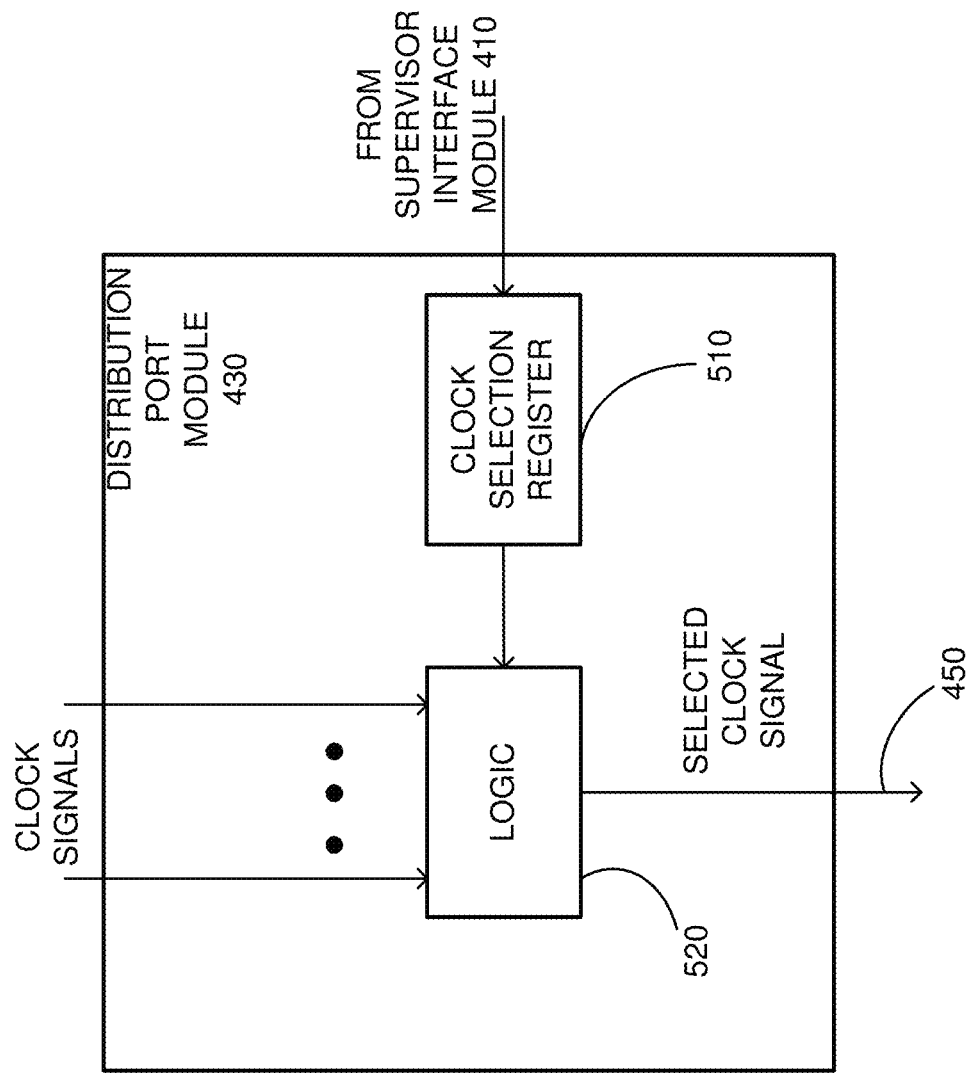
FIG. 5 is an embodiment of the distribution port module of FIG. 4.

FIG. 5 shows an example of the distribution port module 430 of FIG. 4. The distribution port module 430 can include a clock selection register 510 and logic 520 responsive to the clock selection register 510 to select one of multiple input clock signals for output on the output port 450. The clock selection register 510 can be a multi-bit memory register that is writeable and readable from the supervisor so that the supervisor can control switching of the clock signals through use of an identifier of the selected clock signal. The logic 520 can be a simple multiplexer or other combinatorial logic. The distribution port module can also include an embedded transceiver or the transceiver can be separated therefrom. For a failover condition wherein a selected clock signal becomes corrupted or is otherwise not functioning properly, the supervisor CPU 310 can merely write the clock selection register 510 with a different identifier and switch the selected clock signal 450 to a different clock input. All of the clock selection registers within the distribution port modules can be written in parallel. No additional logic is needed to resynchronize the new clock. Instead, the clock signals entering the logic 520 are all validated already and switching between them is seamless and can occur between pulses without any down-stream disruption. All of the clock selection registers can be written with the same value. Alternatively, one or more of the clock selection registers can be written with a different value than other of the clock selection registers. As a result, some of the distribution port modules 430 can output a different clock signal than other distribution ports.

Figure 6:
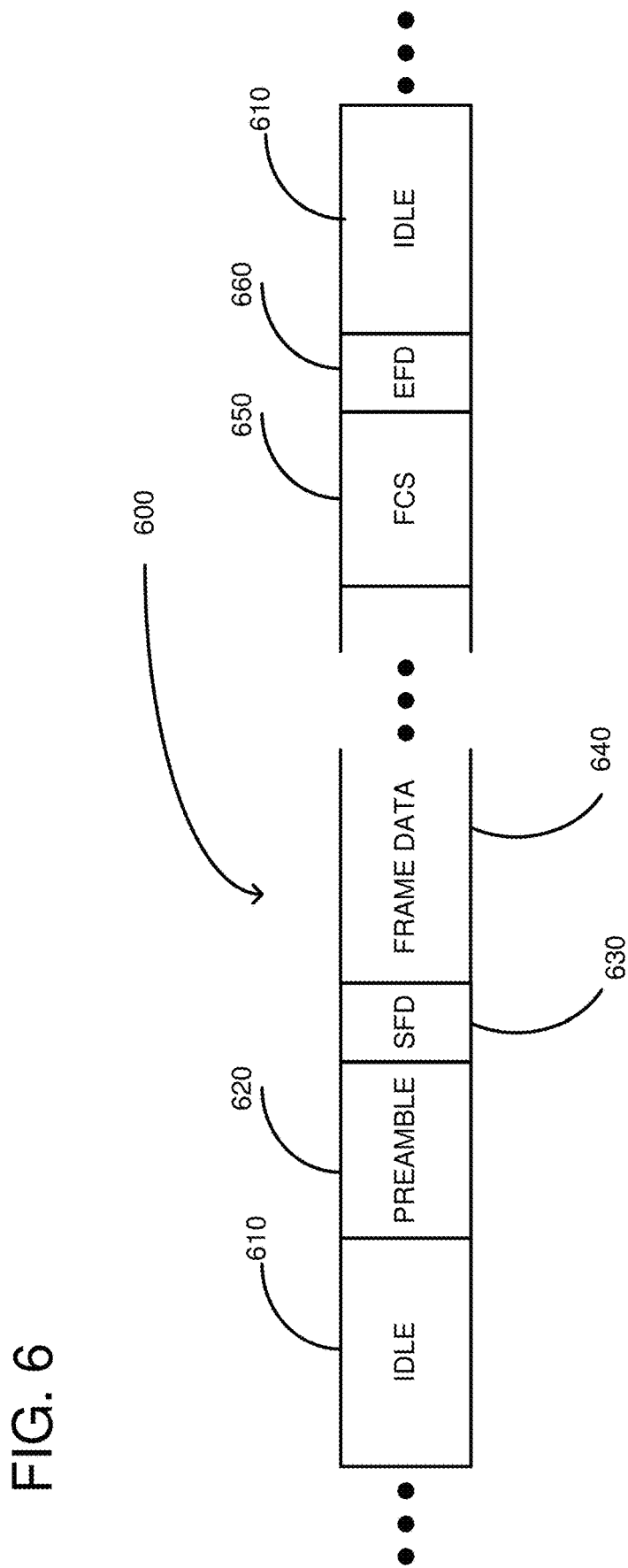
FIG. 6 is an example packet used to transmit a clock signal and metadata.

FIG. 6 is an example packet 600 that can be used. Transmission of the packet can be accomplished using, for example, Manchester Coding, although other methods can be used. With a transition during each bit period, Manchester Coding provides DC-balance and simple encoding and decoding circuitry. The direction of the mid-bit-period transition indicates the data: a transition from high-to-low represents a zero data bit, while a transition from low-to-high represents a one data bit. Transitions during the end-of-bit period can be ignored and do not carry any information. Such transitions exist to place the data signal in the correct state to allow the subsequent mid-bit period transitions.

The idle period 610 is a stream of alternating 1s and 0s. The idle period 610 provides a continuously transitioning data signal with a period equal to a bit period. This can be used by a receiver to align where the middle of the bit period is located. The midpoint of the next bit period is set after each transition detected in the bit period window of the previous bit period. The preamble 620 (e.g., 31 bits) is used to perform phase alignment of the bit period to a timing pulse (described further below in relation to FIGS. 7 and 8). The timing pulse is aligned to the system clock, and, thus, can occur anywhere within the bit period. During the preamble, the bit period is gradually aligned through shifting of the bit period, one system clock per bit period, until the middle of the bit period is sufficiently shifted to align with the timing pulse. The preamble, just like the idle, is sent as alternating 0 and 1 data bits. However, the first bit of the preamble is opposite of the last bit of the idle. A start of frame delimiter (SFD) 630 represents a clock signal. Prior to the SFD, the data bits have been alternating 1's and 0's for the Idle 610 and the Preamble 620. But to indicate the start of a frame, a single bit SFD is sent which matches the last bit of the preamble. Thus, the last bit of the preamble is followed by a same bit for the SFD. The data signal transition for the SFD will be coincident with the timing pulse. Upon receipt of the SFD 630, a timestamp is taken, as this represents the 1PPS timing pulse. The frame data 640 is transmitted following the SFD 630. The format of the frame data can be defined by software so that no fields within the frame data need to be interpreted or modified by hardware. Hardware can treat the frame data as an opaque string of bytes. The transmit frame data bytes can be initialized by software in a local buffer and read by the hardware as needed for frame transmission. The frame data 640 can include metadata associated with the clock signal, such as identification information, status information, authentication information, encryption information, etc. Particular details of the frame data are described above in the tables related to identification and status information.

A frame check sequence (FCS) 650 (e.g., 32 bits) can be used as a cyclic redundancy check that is computed over the entire frame data. The FCS 650 is added to the end of each transmitted frame and validated for each received frame. Different algorithms can be used to compute the FCS 650. The end of frame delimiter (EFD) can be a two-bit period code violation. These code violations are bit periods with a high data signal that does not transition during the bit period window. Using two code violations allows the receiver to distinguish between frame data and the EFD without reserving a special bit sequence that would be prohibited from appearing in the frame data. It also allows for distinguishing between a single spurious code violation. When the EFD is detected, the frame's validity (FCS), alignment (integral number of bytes), and size can be checked.

Figure 7:
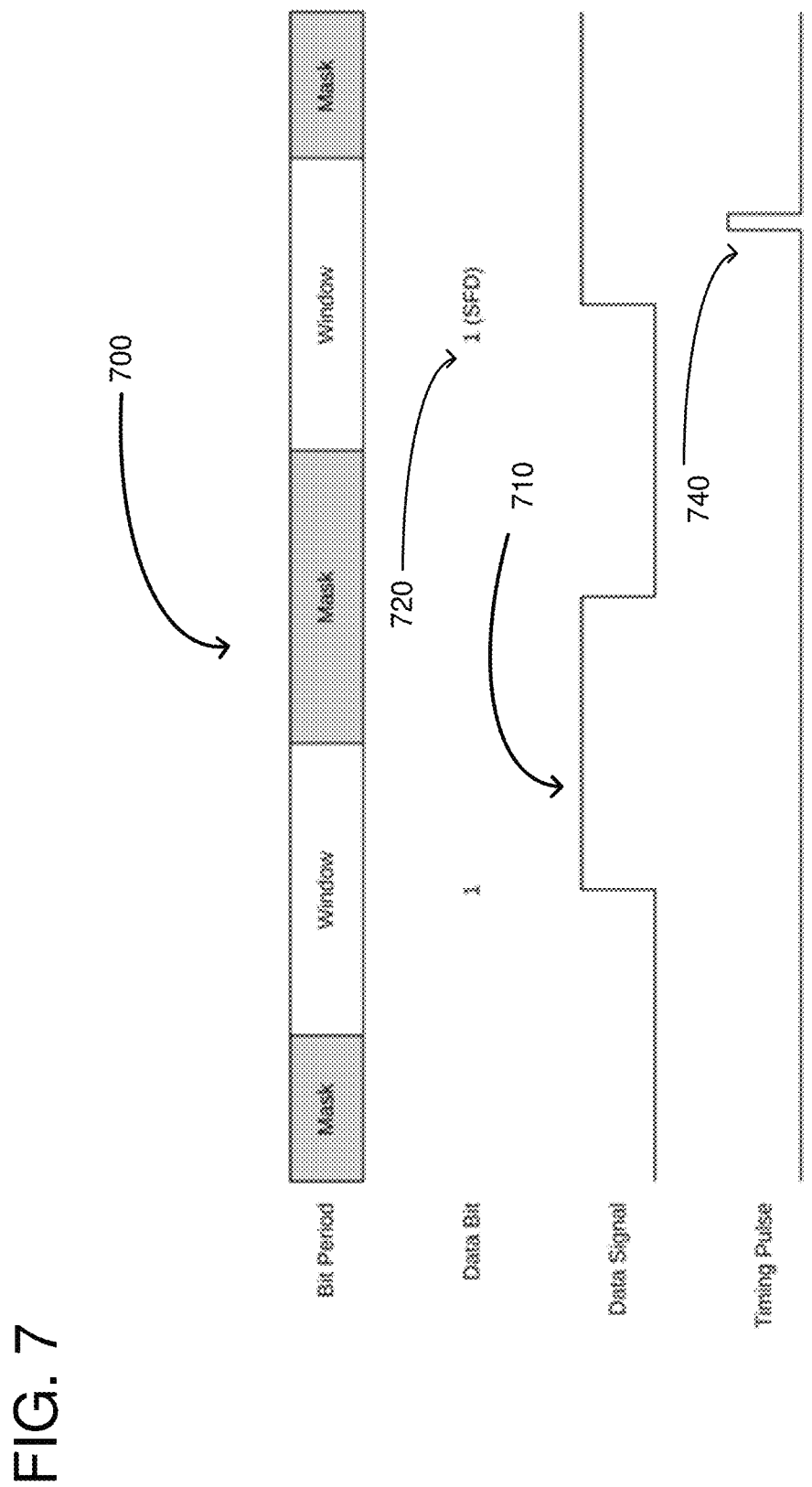
FIG. 7 is a timing diagram illustrating an alignment of a packet and a timing pulse.
Figure 8:
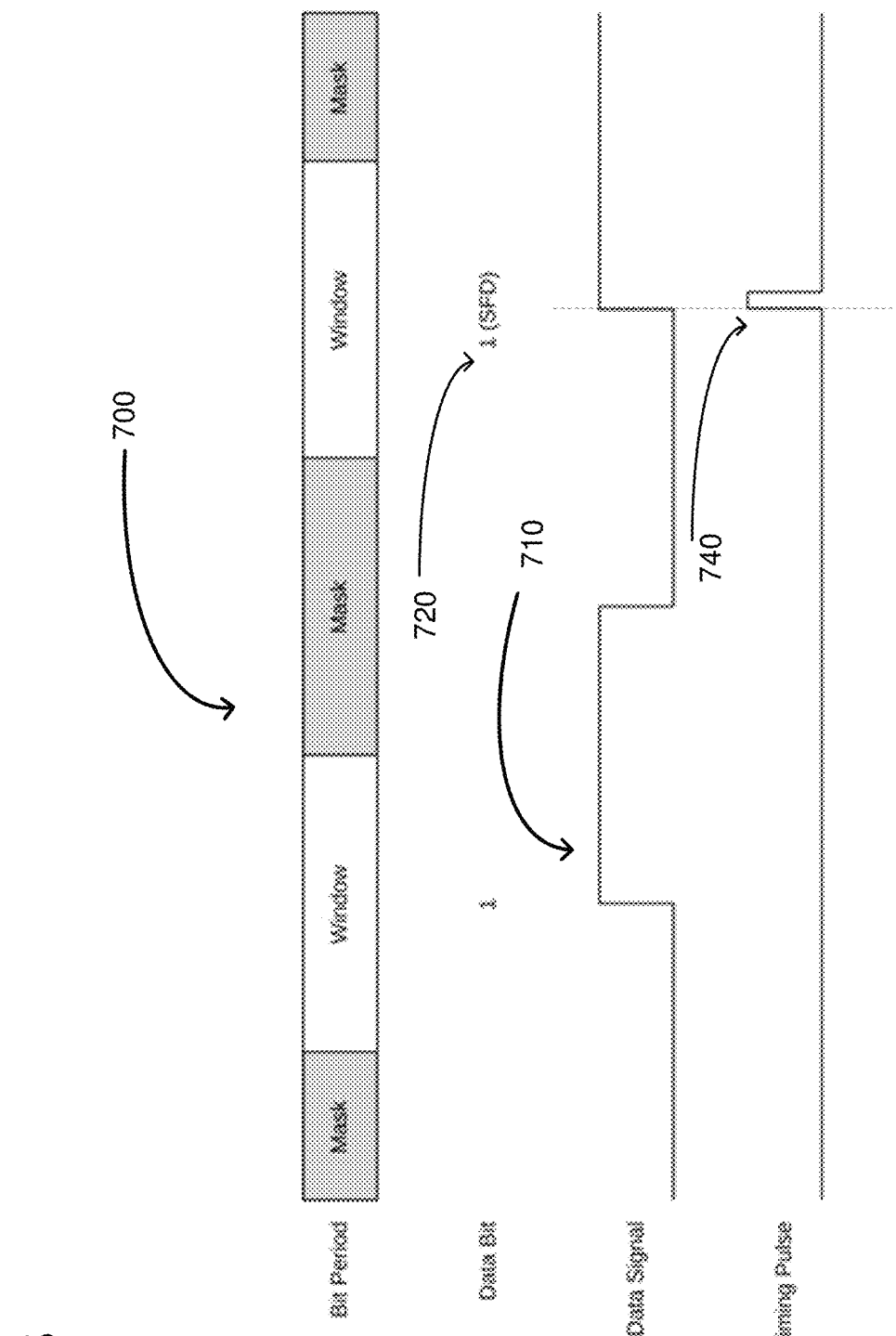
FIG. 8 is a further timing diagram illustrating an alignment of the packet and the timing pulse.

FIGS. 7 and 8 show how the preamble, from FIG. 6 described above, can be shifted to align with a timing pulse. The bit period 700 includes alternating mask periods and window periods, which is a preset pattern that defines when data can be read (window period) and when the data cannot be read (mask period). The alternating mask and window periods can be generated by the clock switching module 320 (FIG. 2). During the window periods, the data signal 710 is valid, and during the mask periods, the data signal 710 can transition as a setup period for the next window period. A value of the data is shown at 720 including the SFD bit. The SFD bit is defined when two consecutive values of 1 occur including a last bit of the preamble. The second value of 1 is the SFD bit, as indicated at 720. A timing pulse 740 is not aligned with the transition of the SFD bit. As shown in FIG. 8, the timing of the preamble is changed so that the SFD bit transitions (aligns) on a front edge of the timing pulse 740. As such, the clock signal defined by the SFD bit is synchronized to the timing pulse. A downstream receiver can then extract the timing pulse based upon when the SFD is received.

In one example, a bit period can be 32 system clocks and the timing pulse can be unaligned by 0 to 31 system clocks. The length of the preamble (31 bit periods) allows up to 31 system clocks of adjustment, in this example. If a receiver's bit period window is 16 system clocks wide, adding one system clock per bit period gives the receiver margin to detect the data signal transition within the bit period's window. The receiver then sets its next bit period based upon where the last transition occurred on the data signal. This allows the receiver to compensate for the gradual shifting of the bit period by a transmitter. When sending the idle pattern of alternating 1's and 0's, the selected clock signal is examined when the data signal transitions (16 system clocks, midway through the bit period). The preamble begins when the selected signal is equal to 1024, after masking the least significant 5 bits. In this particular example, 1024 system clocks are 32 bit periods, which is the length of the preamble (31 bits) plus the SFD (1 bit). The least significant 5 bits are masked because those are the number of system clocks which will be added to the bit periods of the preamble. The data bits of the preamble are alternating 1's and 0's, starting with the opposite of the last idle bit prior to the preamble. This makes the preamble indistinguishable from idles, except for the bit period adjustments. At 16 system clocks into each bit period of the preamble, the data signal is inverted and the least significant 5 bits of the selected clock signal are examined. If they are non-zero, then an extra system clock is added to the current bit period, making it 33 system clocks instead of 32. Eventually, somewhere between 0 and 31 preamble bit periods, the least significant 5 bits of the selected clock signal will be zero in the middle of the bit period and the extra system clocks will no longer be added to the preamble bit periods. At this point, the timing pulse is aligned with the midpoint of the bit period.

Figure 9:
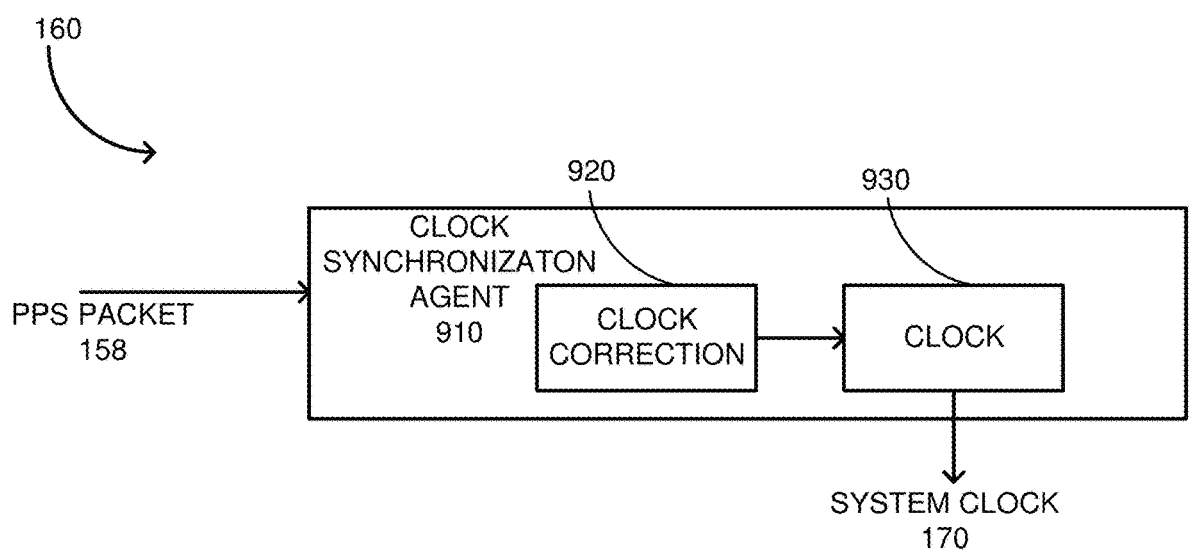
FIG. 9 is an example synchronization agent that receives the clock signal in the packet.

FIG. 9 shows further details of the clock synchronization 160 from FIG. 1, which includes a clock synchronization agent 910. The clock synchronization agent 910 receives the PPS packet 158, detects an edge of the SFD, and uses clock correction circuitry 920 to adjust a system clock 170 (see also FIG. 1) output by a clock generator 930. Thus, a clock pulse is extracted from the PPS packet by detecting two consecutive equal bits (e.g., two consecutive 1s in FIG. 8 as shown by the data bits) and using an edge of the second bit as the front edge of the timing pulse. The system clock 170 can be synchronized to the detected edge of the second bit to synchronize timing in the compute service provider 100 across multiple server computers. Although not shown, the clock synchronization agent can also be within the clock switching circuits, such as clock switching circuit 210.

Figure 10:
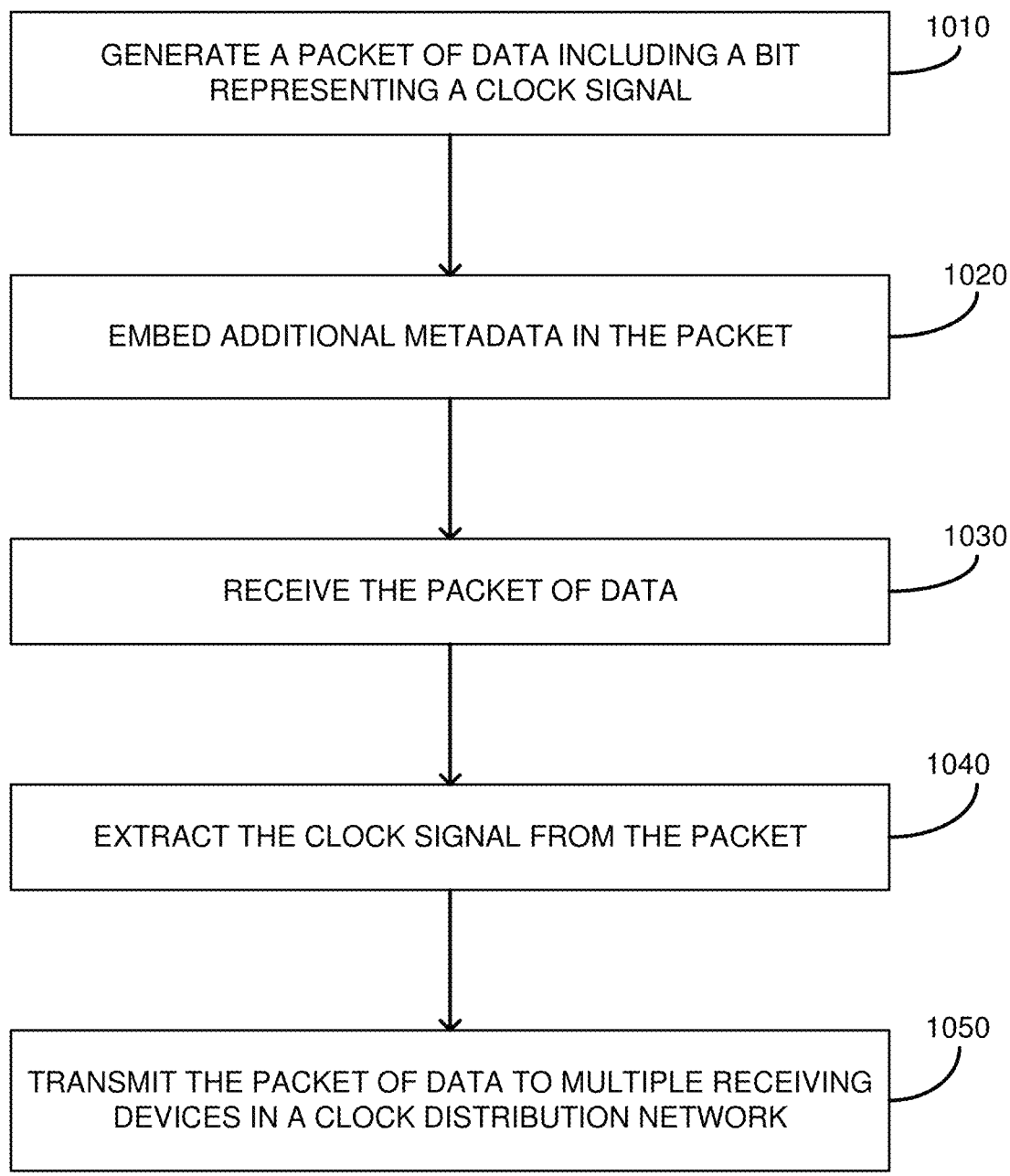
FIG. 10 is a flowchart according to one embodiment for transmitting a clock signal with metadata within a packet.

FIG. 10 is a flowchart according to one embodiment for using a packet to transmit a clock signal, wherein the packet embeds additional information about the clock signal. The method of FIG. 10 is performed by, for example, various components of the system of FIG. 1. In process block 1010, a packet of data is generated including a bit representing a clock signal. For example, in FIG. 6, the SFD bit 630 can represent a clock signal. The generating of the packet of data can include synchronizing a timing signal to a preamble timing of the packet of data. For example, FIG. 8 shows synchronizing the timing signal 740 to the preamble shown at 710. In process block 1020, additional metadata is embedded in the packet. For example, in FIG. 6, the frame data 640 can include metadata related to identification information, status information, etc., as described above. The metadata can also include a frame check sequence 650 used to verify that the packet has not been corrupted. The embedding of the metadata can be performed by the timing port modules 420 (FIG. 4). In process block 1030, the packet of data is received. For example, in FIG. 3, the packets 330 can be received in the clock switching module 320. In process block 1040, the clock signal can be extracted from the packet. For example, in FIG. 9, the clock synchronization agent 910 can extract the SFD bit 630 from the packet. In process block 1050, the packet of data is transmitted to multiple receiving devices in a clock distribution network. For example, in FIG. 2, the clock switching circuits (e.g., 220) can retransmit the packets to downstream clock switching circuits. The timing ports (420, FIG. 4) can update the frame data 640 to include source information associated with the transmitting clock switching circuit.

Figure 11:
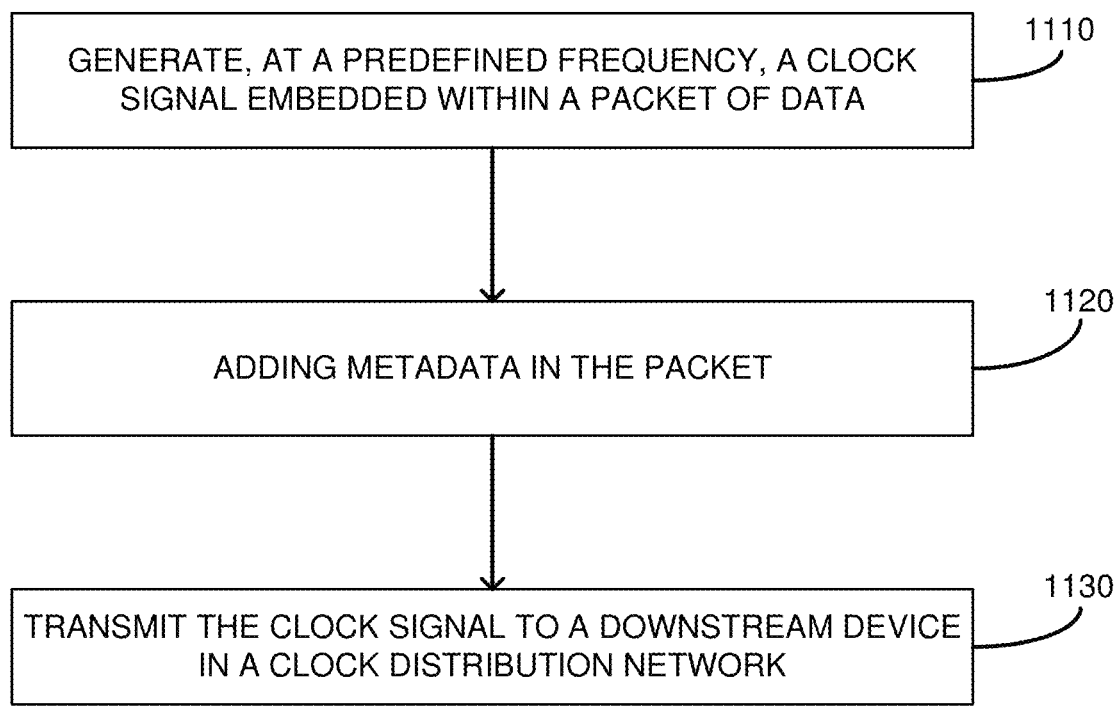
FIG. 11 is a flowchart according to another embodiment for transmitting a clock signal with metadata within a packet.

FIG. 11 is a flowchart according to another embodiment of a method performed by, for example, the hardware shown in FIG. 2. In process block 1110, a clock signal is generated at a predefined frequency and embedded within a packet of data. For example, in FIG. 6, the SFD bit is generated and is synched with a timing pulse (See FIGS. 7 and 8). The clock signal can occur at any desired frequency, such as every 1 second. In process block 1120, metadata is added to the packet. For example, in FIG. 6, frame data 640 can be added to the packet. The frame data can include identification, status, and authentication/validation information. In process block 1130, the clock signal can be transmitted to a downstream device in a clock distribution network. For example, in FIG. 2 the clock signal can be further transmitted to downstream clock switching circuits in the clock distribution network 150.

Figure 12:
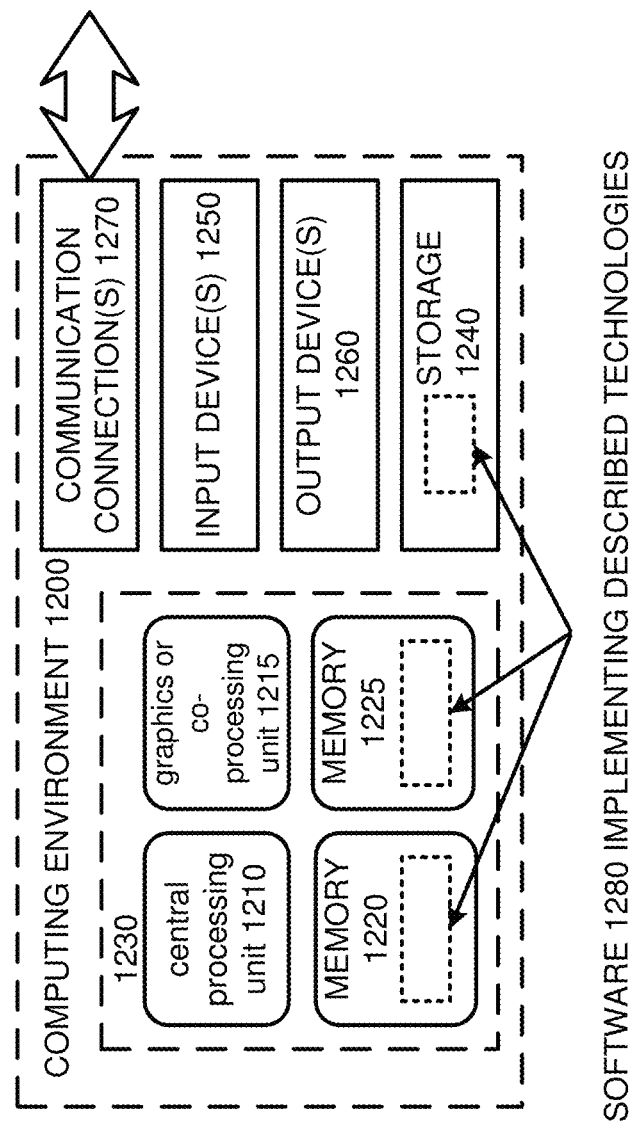
FIG. 12 depicts a generalized example of a suitable computing environment in which the described innovations may be implemented.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, etc.).

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s). The computing environment 1200 can be used for components of FIG. 3, such as the supervisor CPU 310.

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. The communication connection 1270 can be coupled to the dedicated clock distribution network 150 (FIG. 1). Thus, the computing environment 1200 can receive a PPS signal 158 and synchronize its system clock 170 using the PPS signal.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of transmitting a clock signal in a clock distribution network, the method comprising:
generating a packet of data including a bit representing a clock signal, wherein the generating of the packet of data includes synchronizing a timing signal from a reference clock to a preamble timing of the packet of data using a clock switching circuit;
embedding, by the clock switching circuit, metadata within the packet of data, the metadata including information associated with the clock signal and transmitting the packet of data using a clock distribution circuit;
receiving the packet of data in a receiving device;
extracting the clock signal from the packet of data; and
synchronizing a system clock on the receiving device to the extracted clock signal to synchronize the system clock to the timing signal.

2. The method of claim 1, wherein the extracting of the clock signal includes detecting two equal values in pulses in sequence and using a second of the pulses as the clock signal.

3. The method of claim 1, wherein the metadata includes identification information of a sending device of the packet of data.

4. The method of claim 3, wherein the identification information includes one or more of the following: a Media Access Control (MAC) address, an Internet Protocol (IP) address, a host name, a model number, a serial number, or a port number.

5. A method, comprising:
generating, at a predefined frequency, a clock signal embedded within a packet of data using a clock switching circuit, wherein the packet of data includes a bit representing the clock signal;
adding metadata to the packet of data using the clock switching circuit, the metadata including information associated with the clock signal; and
transmitting the packet of data to a downstream device in a clock distribution network to synchronize the downstream device with the clock signal using the bit representing the clock signal within the packet of data.

6. The method of claim 5, wherein the clock distribution network is within a compute service provider environment and is separate from a network for distributing user packets.

7. The method of claim 5, wherein the metadata includes an identifier of a source that is generating the clock signal.

8. The method of claim 7, wherein the identifier of the source includes one or more of the following: a Media Access Control (MAC) address, an Internet Protocol (IP) address, a host name, a model number, a serial number, or a port number.

9. The method of claim 5, wherein the metadata includes status information associated with the clock signal.

10. The method of claim 5, wherein the metadata includes authentication information.

11. Method of claim 5, wherein the transmitting of the packet is a serial transmission using Manchester Coding.

12. One or more computer-readable media, which are non-transitory, comprising computer-executable instructions that, when executed, cause a computing system to perform a method comprising:
generating, at a predefined frequency, a clock signal embedded within a packet of data, wherein the generating of the packet of data with the embedded clock signal includes synchronizing a timing signal from a reference clock to a preamble of the packet of data;
adding metadata to the packet of data, the metadata including information associated with the clock signal; and
transmitting the clock signal to a downstream device in a clock distribution network by transmitting the packet of data with the embedded clock signal to the downstream device.

* * * * *